United States Patent
Bach et al.

(10) Patent No.: US 6,411,080 B1
(45) Date of Patent: Jun. 25, 2002

(54) SIGNAL PROCESSING METHOD FOR A VARIABLE RELUCTANCE VEHICLE SPEED SENSING MECHANISM

(75) Inventors: James C. Bach, Carmel; Kevin M. Gertiser, Noblesville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/821,992

(22) Filed: Apr. 2, 2001

(51) Int. Cl.$^7$ .............................. G01P 3/48; G01P 3/54; G01R 33/025
(52) U.S. Cl. .................. 324/173; 324/225; 324/207.12; 324/207.17
(58) Field of Search .................................. 324/173, 174, 324/166, 207.15, 207.16, 207.17, 207.12, 207.25, 225

(56) References Cited

U.S. PATENT DOCUMENTS 4,258,324 A * 3/1981 Henrich ...................... 324/392
4,837,508 A * 6/1989 Garnault ...................... 324/166

* cited by examiner

Primary Examiner—Edward Lefkowitz
Assistant Examiner—Reena Aurora
(74) Attorney, Agent, or Firm—Jimmy L. Funke

(57) ABSTRACT

An improved method of measuring vehicle speed based on the output signal of a variable reluctance speed sensor responsive to the teeth of a transmission output gear adjusts the sensitivity of a signal processing circuit in dependence on the mode of operation of the vehicle so as to reduce sensitivity to output signals produced by gear tooth vibration. The signal processing circuit only passes portions of the sensor output signal that have an amplitude greater than a predefined threshold and a frequency less than a predefined frequency, except when an electronic controller identifies a condition of potentially erroneous speed sensing characterized by substantially stationary vehicle operation with the engine decoupled from the output gear and an engine speed in excess of a calibrated threshold. Under the identified condition, the controller reduces the sensitivity of the signal processing circuit by raising the predefined amplitude threshold and lowering the predefined cut-off filter frequency so that only large amplitude, low frequency signals are passed.

5 Claims, 2 Drawing Sheets

SIGNAL PROCESSING METHOD FOR A VARIABLE RELUCTANCE VEHICLE SPEED SENSING MECHANISM

TECHNICAL FIELD

This invention relates to measuring the speed of a vehicle, and more particularly to a method of minimizing erroneous speed measurement due to the effects of vibration on a variable reluctance speed sensing mechanism.

BACKGROUND OF THE INVENTION

The speed of a vehicle is typically measured for display and control purposes by installing a variable reluctance sensor in proximity to the teeth of a rotary wheel such as a transmission output gear. When a gear tooth passes the sensor, the magnetic flux through the sensor changes, producing a corresponding quasi-sinusoidal pulse on an output signal of the sensor, and a signal processing circuit responsive to the sensor output signal provides a speed signal to an electronic control module (ECM). As a practical matter, the signal processing circuit may be located within the ECM, as a sub-block between the sensor input pins and a CPU that measures the signal frequency for purposes of calculating vehicle speed. With any individual sensor, the output signal amplitude varies with the detected change in flux, but the amplitude can also vary from sensor to sensor due to manufacturing tolerances and installation variations. Accordingly, the objective of the signal processing circuit is to provide maximum filtering of the sensor output signal for noise rejection, while still recognizing legitimate signals produced by a minimum output sensor, and to provide a corresponding digital speed signal to the ECM.

The above-described approach works well under most conditions, but is subject to erroneous speed indications when the transmission output gear is unloaded and stationary and the engine speed is relatively high. Under these conditions, the transmission output gear tends to vibrate both rotationally and/or radially, which can produce significant and psuedo-random magnetic flux variations in the variable reluctance sensor, particularly if a gear tooth happens to be directly aligned with the sensor. Unfortunately, the sensor output signal produced under these conditions is frequently indistinguishable from a normal sensor output signal; that is, the amplitude and frequency of the vibrational signal can fall within the expected amplitude and frequency ranges of a legitimate sensor output signal. Accordingly, what is needed is a method of measuring vehicle speed that recognizes a legitimate sensor output signal, but that is insensitive to sensor output signals produced by gear tooth vibration.

SUMMARY OF THE INVENTION

The present invention is directed to an improved method of measuring vehicle speed based on the output signal of a variable reluctance sensor responsive to the teeth of a transmission output gear, wherein the sensitivity of a signal processing circuit receiving the sensor output signal is adjusted in dependence on the mode of operation of the vehicle so as to reduce sensitivity to output signals produced by gear tooth vibration. According to the invention, the signal processing circuit only passes portions of the sensor output signal that have an amplitude greater than a pre-defined threshold and a frequency less than a predefined frequency, except when the ECM identifies a condition of potentially erroneous speed sensing characterized by substantially stationary vehicle operation with the engine decoupled from the output gear and an engine speed in excess of a calibrated threshold. Under the identified condition, the ECM reduces the sensitivity of the signal processing circuit by raising the predefined threshold and lowering the predefined frequency so that only large amplitude, low frequency signals are passed.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
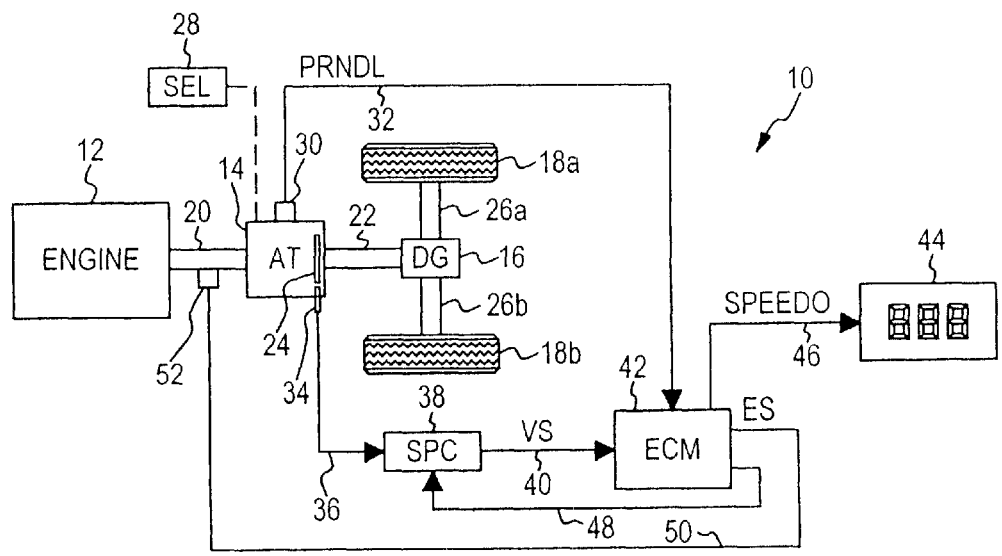
FIG. 1 is a diagram of a motor vehicle drivetrain and vehicle speed measurement system according to this invention, including a variable reluctance speed sensor, a signal processing circuit and a microprocessor-based electronic control module.

The signal processing method of the present invention is disclosed in the context of the motor vehicle drivetrain designated generally in FIG. 1 by the reference numeral 10. Referring to FIG. 1, the drivetrain 10 includes an engine (ENG) 12 an automatic transmission (AT) 14, a differential gearset (DG) 16 and a pair of drive wheels 18a, 18b. The transmission 14 includes a multiple range gearset connected to the engine output shaft 20 through a fluid coupling (such as a torque converter), and to a transmission output shaft 22 through an output gear 24. The output shaft 22, in turn, is coupled to the drive wheels 18a, 18b via differential gearset 16, and a pair of respective prop shafts 26a, 26b. A driver manipulated range selector (SEL) 28 is mechanically coupled to transmission 14 for establishing the desired transmission range, such as Park, Reverse, Neutral, Drive or Low, and a sensor 30 (which may comprise one or more mechanical or pressure-activated switches) produces an electrical signal identified as PRNDL on line 32 to indicate the established range. Alternatively, of course, the transmission range may be electrically established by an electronic controller in response to the range selector position, vehicle speed, engine load and so on; in such a mechanization, the PRNDL signal and other signals utilized by more than one electronic module may be communicated among the modules via a serial or parallel data bus.

The speed of the vehicle is determined by measuring the rotational speed of the transmission output shaft 22 and multiplying the measured speed by a constant that accounts for the speed ratio of differential gearset 16, the circumference of the drive wheels 18a, 18b and the number of output pulses developed per revolution of the output shaft 22. To this end, the variable reluctance sensor 34 is mounted on a housing of transmission 14 with its end positioned in proximity to the output gear 24 for producing a quasi-sinusoidal electrical signal on line 36 having a frequency proportional to the speed of output shaft 22. The sensor output signal on line 36 is provided to a signal processing circuit (SPC) 38, which filters the signal and develops a corresponding digital speed signal (VS) on line 40. The digital speed signal VS is sampled by a microprocessor-based electronic control module (ECM) 42 (usually implemented as a powertrain control module or a transmission control module), which computes the vehicle speed as explained above, and drives a vehicle speed indicator 44 via line 46. As explained below, the ECM 42 also controls the operation of signal processing circuit 38 via line 48. Finally, the ECM 42 also receives the PRNDL signal on line 32, and an engine speed signal ES developed on line 50 by engine speed sensor 52. As a practical matter, SPC 38 is typically located inside ECM 42, and the PRNDL signal and other input signals may be communicated to ECM 42 via a data bus, as mentioned above.

Figure 2:
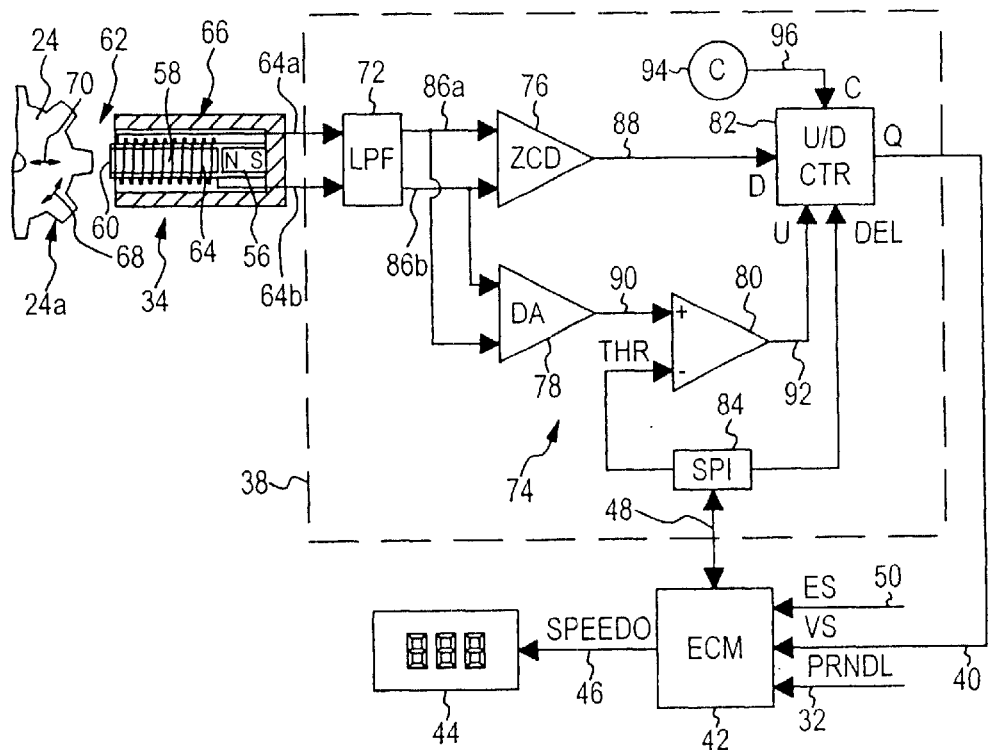
FIG. 2 is a diagram detailing the speed sensor and signal conditioning circuit of FIG. 1.

Referring to FIG. 2, the variable reluctance sensor 34 includes a permanent magnet 56 aligned with a ferrous rod 58, with the exposed end 60 of rod 58 being separated from the teeth 24a of output gear 24 by an air gap 62. A coil 64 is wound around the rod 58, and a magnetic housing 66 encloses magnet 56, coil 64, and all but the end 60 of rod 58. As the output gear 24 rotates, its ferrous teeth 24a pass the end 60 of rod 58, producing a quasi-sinusoidal change in the magnetic flux through rod 58, and a corresponding quasi-sinusoidal electrical current in the coil 64. The coil wires 64a and 64b are applied to the signal processing circuit 38 for producing a digital speed signal on line 40, as mentioned above in respect to FIG. 1.

Obviously, the amplitude of the sensor output signal can vary depending on the performance characteristics of sensor 34, the size of the air gap 62, and other factors, and the signal processing circuit 38 is ordinarily configured to provide maximum filtering for noise rejection, while still recognizing legitimate signals produced by a minimum output sensor, and to generate a corresponding digital speed signal on line 40. However, the conventional approach is subject to erroneous speed indications when the output gear 24 is unloaded (i.e., when the transmission is in the Park or Neutral ranges) and stationary (i.e., the vehicle is not moving) and the engine speed ES is relatively high. Under these conditions, the output gear 24 tends to vibrate both rotationally (as indicated by arrow 68) due to gear lash and radially (as indicated by arrow 70) due to bearing play. This vibration can produce significant and psuedo-random magnetic flux variations in the rod 58, particularly if a gear tooth 24a happens to be directly aligned with the rod end 60. Unfortunately, the sensor output signal produced under these conditions is frequently indistinguishable from a normal sensor output signal; that is, the amplitude and frequency of the vibrational signal can fall within the expected amplitude and frequency ranges of a legitimate sensor output signal. Thus, simple filtering is ineffective to prevent the ECM 42 from displaying an erroneous speed indication on indicator 44 due to vibrational noise.

The problem discussed above is overcome according to this invention by having ECM 42 dynamically adjust the sensitivity of signal processing circuit 38 via line 48 in dependence on the mode of operation of the vehicle so as to reduce sensitivity to output signals produced by gear tooth vibration. As explained below, the signal processing circuit 38 only responds to portions of the sensor output signal that have an amplitude greater than a predefined threshold THR and a frequency less than a cutoff frequency defined by a time delay DEL, except when the ECM 42 identifies a condition of potentially erroneous speed sensing characterized by substantially stationary vehicle operation with the engine 12 decoupled from the drive wheels 18a, 18b and an engine speed ES in excess of a calibrated threshold ES_CAL. Under the identified condition, the ECM 42 signals the signal processing circuit 38 via line 48 to raise the predefined threshold THR and lower the cutoff frequency defined by DEL, thereby making the signal processing circuit 38 substantially insensitive to the sensor output signal on lines 64a, 64b. As a result, the vibration-induced content of the sensor output signal is ignored, and the vehicle speed indication remains sufficiently accurate since the vehicle is substantially stationary during the identified condition.

The signal processing circuit includes a conventional low-pass filter (LPF) 72 for attenuating signals above a roll-off frequency corresponding to unrealistically high vehicle speeds, and a digital filter circuit 74 for passing only those portions of the filtered signal having an amplitude greater than threshold THR and a frequency less than the cutoff frequency defined by DEL. The digital filter circuit includes a zero crossing detector (ZCD) 76, a differential amplifier (DA) 78, a comparator 80 and an up/down counter (U/D CTR) 82. The ECM 42 provides the threshold THR to comparator 80 and the time delay DEL to counter 82 via the serial peripheral interface (SPI) circuit 84 and line 48. The zero crossing detector 76 is responsive to the filtered sensor signal on lines 86a, 86b, and produces a uni-polar square wave on line 88 having logic level transitions corresponding to the polarity changes of the filtered sensor signal. The low state of the signal on line 88 (corresponding to negative half-cycle of the sensor signal) toggles counter 82 to the down (D) state (count-down mode). The differential amplifier 78 is also responsive to the filtered sensor signal on lines 86a, 86b, and produces an output signal on line 90 which is compared to the threshold THR by comparator 80. When the output of differential amplifier on line 90 exceeds THR, the comparator 80 changes state, and the leading edge (high-state) of the signal on line 92 toggles counter 82 to the up (U) state (count-up mode). A high frequency pulsetrain produced by clock 94 is applied to a clock (C) input of counter 82 via line 96, and the time delay DEL provided to SPI circuit 84 by ECM 42 is applied to a delay input of counter 82. Finally, the output (Q) of counter 82 supplies the digital speed signal to ECM 42 on line 40.

In an alternative implementation, the digital outputs of ZCD 76 and comparator 80 could be "ANDed" to generate an Up/Down (U/D) control signal for counter 82. In this case, the counter 82 would operate in the count-up mode when the U/D control signal is high (i.e., during positive half-cycles of the filtered sensor signal that exceed THR), and the in the count-down mode when the U/D control signal is low (i.e., during negative half-cycles of the filtered sensor signal that exceed THR.

With the threshold THR and the time delay DEL set to zero, the counter 82 will produce a digital speed signal on line 40 corresponding to the current fluctuation produced in sensor coil 64 due to the rotation of output gear 24 by counting clock pulses in the Up direction when the sensor signal is positive, and in the Down direction when the sensor signal is negative. However, when threshold THR is non-zero and the output of differential amplifier 78 on line 90 fails to exceed THR, counter 82 stays in the Down state, and the digital speed output on line 40 goes to (or stays at) zero. Thus, the threshold THR controls the sensitivity of the signal processing circuit 38 to input signal amplitude. The parameter DEL introduces a time delay between the receipt of a rising edge at the Up or Down counter inputs and the respective counting of clock pulses. Thus, if DEL is non-zero, a sensor output signal that has a negative or positive half-cycle duration that is less than DEL will be ignored. Thus, the time delay DEL effectively establishes the cutoff frequency $(1/(2*\text{DEL}))$ for the signal processing circuit 38.

Figure 3:
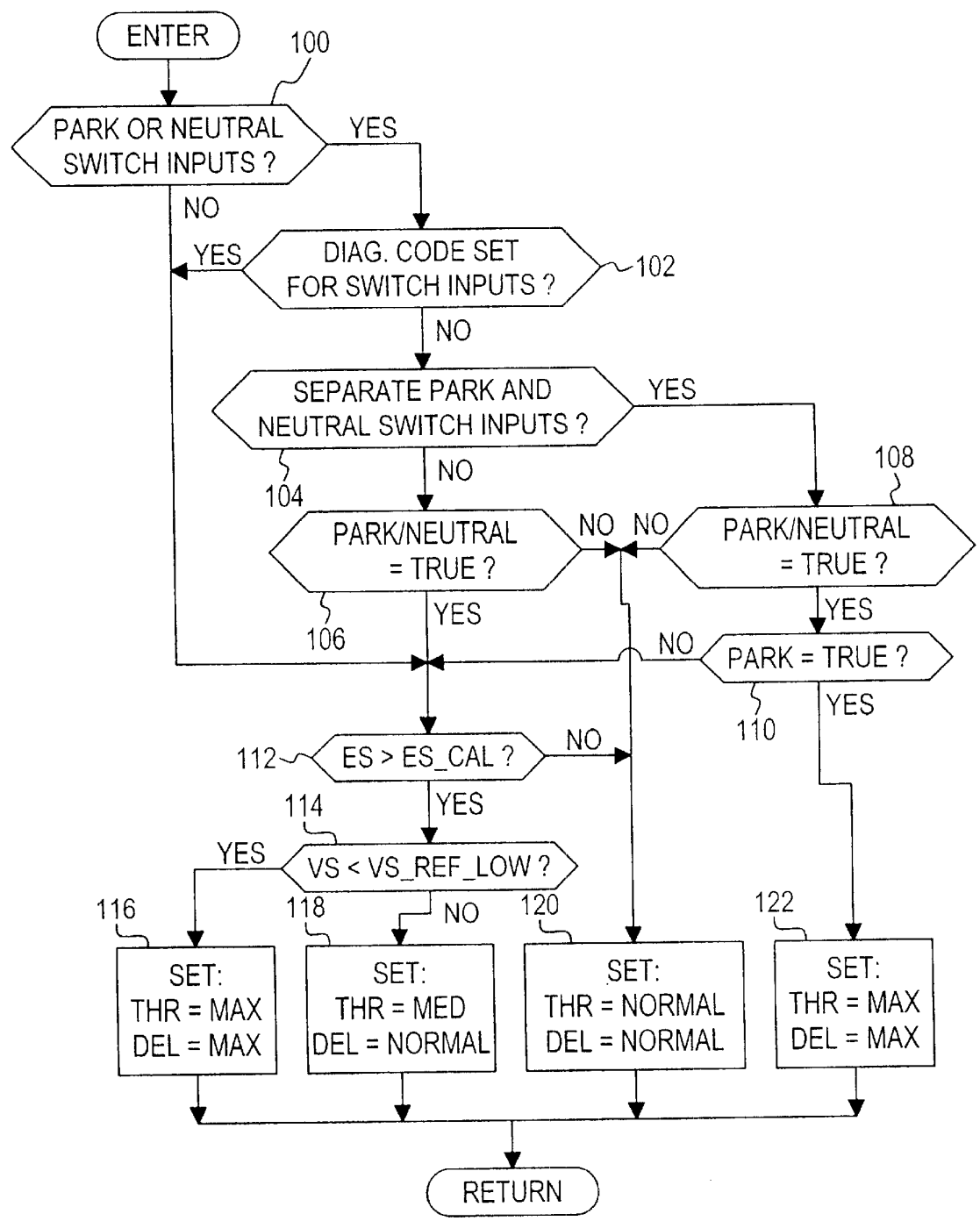
FIG. 3 is a flow diagram illustrating a software routine executed by the electronic control module of FIG. 1 according to this invention.

The flow chart of FIG. 3 illustrates a software routine periodically executed by ECM 42 for setting the threshold THR and the time delay DEL according to this invention. The blocks 100, 102, 104, 106, 108 and 110 analyze the transmission range information provided to ECM 42; the analysis is not specific to the embodiment illustrated in FIG. 1, but is generalized for applicability to different transmission and controller configurations. In the illustrated embodiment, a PRNDL signal is supplied to ECM 42 on line 32, and if no diagnostic malfunction codes for the input are set, the blocks 100 and 104 will be answered in the affirmative, and the block 102 in the negative. If the transmission 14 is in a range other than Park or Neutral, block 108 will be answered in the negative; in this case, the output gear 24 is not unloaded, and the block 120 is executed to set THR and DEL to normal values. The normal THR value is set to ignore sensor signals having an amplitude lower than a good minimum output sensor, and the normal DEL value is set to ignore sensor signals of a frequency that is unrealistically high for a vehicle. If the transmission is in Park, the blocks 108 and 110 will be answered in the affirmative, and block 122 is executed to set THR and DEL to maximum values, making signal processing circuit 38 substantially insensitive to the sensor output signal on lines 64a, 64b. This precludes an erroneous vehicle speed indication under a condition where it is known that the vehicle is stationary (i.e., in Park range). If the transmission is in Neutral, block 110 will be answered in the negative, and blocks 112 and 114 are executed to compare ES and VS to respective thresholds $ES_{13}$ CAL and VS_REF_LOW, as described below.

In embodiments where no transmission range information is provided to ECM 42 (as when transmission 14 is a manual transmission), the block 100 is answered in the negative; in this case, it cannot be established whether the output gear 24 is unloaded, and therefore THR and DEL are set on the basis of engine speed ES and the raw vehicle speed VS, as described below. The same result occurs if range information is provided, but diagnostic malfunction codes for the input are set, in which case blocks 100 and 102 will be answered in the affirmative, indicating that the range information cannot be trusted.

In embodiments where the transmission range input cannot distinguish between Park and Neutral, the block 104 is answered in the negative. If the input indicates that the transmission 14 is in a range other than Park or Neutral, block 106 will be answered in the negative, and block 120 is executed to set THR and DEL to normal values, as described above. If the input indicates that the transmission 14 is in Park or Neutral, block 106 will be answered in the affirmative, and THR and DEL are set on the basis of engine speed ES and the raw vehicle speed VS, as described below.

As described above, the blocks 112 and 114 are executed to determine if there is a potential for vibrational speed signal generation when the established transmission range is either unknown, Neutral or Park/Neutral. Blocks 112 compares engine speed ES to a threshold engine speed ES_CAL, and block 114 compares the raw vehicle speed VS to a vehicle speed threshold VS_REF_LOW. The engine speed threshold ES_CAL represents a relatively high engine speed (such as 4000 RPM) above which there is a potential for generating a speed sensor output signal due to vibration, whereas the vehicle speed threshold represents a relatively low vehicle speed such as 5 MPH. If ES is not above ES_CAL, the block 120 is executed to set THR and DEL to the normal values, as described above. However, if ES>ES_CAL, the blocks 116 or 118 will be executed lower the sensitivity of the signal processing circuit. The block 114 compares VS to VS_REF LOW as soon as ES exceeds the threshold ES_CAL. If VS >VS_REF_LOW at such point, the potential for vibrational noise is low, but the block 118 sets the threshold THR to a medium value MED (DEL is set to Normal) to reduce the sensitivity of signal processing circuit 38 to vibration induced speed sensor signals. If VS<VS_REF_LOW when ES exceeds ES_CAL, the potential for vibrational noise is significant, and the vehicle is substantially stationary; under such conditions, block 116 sets THR and DEL to the maximum values to render signal processing circuit 38 substantially insensitive to the sensor output signal on lines 64a, 64b.

In summary, the present invention provides an improved method of measuring vehicle speed based on the output signal of a variable reluctance speed sensor by automatically reducing the sensitivity of the measuring circuit to the sensor output signal when a condition of potentially erroneous speed sensing due to gear tooth vibration is detected. While the invention has been described in reference to the illustrated embodiment, it is expected that various modifications in addition to those mentioned above will occur to those skilled in the art. For example, the method can also be applied to front wheel drive vehicles, and to vehicles having a manual transmission instead of an automatic transmission, in which case a Neutral range can be identified when either the clutch is disengaged or the gear shifter is in the Neutral position. Additionally, various other ways of detecting the condition of potentially erroneous speed sensing are possible; for example, a wheel speed signal or the like may be used to detect when the vehicle is stationary, and so on. Accordingly, it will be understood that methods incorporating these and other modifications may fall within the scope of this invention, which is defined by the appended claims.

What is claimed is:

1. A signal processing method for a variable reluctance sensor that is responsive to movement of a toothed wheel that rotates with a drive wheel of a vehicle, the vehicle having an engine that is selectively coupled to the drive wheel, the signal processing method comprising the steps of:

processing an output signal of said speed sensor by selecting portions of the signal having an amplitude greater than a predefined amplitude threshold and a frequency less than a predefined filter frequency;

determining a speed of said vehicle based on the selected portions of said sensor output signal;

detecting a first condition of potentially erroneous speed sensing characterized by substantially stationary vehicle operation with the engine decoupled from the drive wheel and an engine speed in excess of a calibrated threshold; and raising said predefined amplitude threshold to a maximum value and lowering said predefined filter frequency to a minimum value so long as said first condition of potentially erroneous speed sensing is detected.

2. The signal processing method as set forth in claim 1, wherein substantially stationary vehicle operation is detected when the determined speed of said vehicle is less than a threshold speed.

3. The signal processing method as set forth in claim 2, including the steps of:

detecting a second condition of potentially erroneous speed sensing characterized by engine speed in excess of said calibrated threshold and a determined vehicle speed in excess of said threshold speed; and raising said predefined amplitude threshold to a value intermediate a normal value and said maximum value so long as said second condition of potentially erroneous speed sensing is detected.

4. The signal processing method as set forth in claim 1, wherein said vehicle includes a transmission selectively coupling said engine to said drive wheel and having a Park range in which said drive wheel is maintained stationary, and the method includes the steps of:

developing a range signal indicative of an established range of said transmission; and raising said predefined amplitude threshold to said maximum value and lowering said predefined filter frequency to said minimum value when the developed range signal indicates that said Park range is established.

5. The signal processing method as set forth in claim 1, wherein said vehicle includes a transmission selectively coupling said engine to said drive wheel and having one or more ranges in which said engine is de-coupled from said drive wheel, and the method includes the steps of:

developing a range signal indicative of an established range of said transmission; and detecting that said engine is decoupled from said drive wheel when the developed range signal indicates that one of said one or more ranges is established.

* * * * *